United States Patent Office 3,682,812
Patented Aug. 8, 1972

3,682,812
DEWAXING OF WAXY PETROLEUM DISTILLATES
William L. Streets and Charles O. Glenn, Bartlesville, Okla., assignors to Phillips Petroleum Company
No Drawing. Filed May 25, 1970, Ser. No. 40,353
Int. Cl. C10g 43/06
U.S. Cl. 208—38                     5 Claims

ABSTRACT OF THE DISCLOSURE

A small effective amount of a hydrogenated butadiene-styrene random or block copolymer is added to a waxy petroleum distillate such as a diesel fuel and the treated fuel is cooled and filtered, yielding a relatively oil-free wax at a high filtration rate.

---

This invention relates to the dewaxing of liquid petroleum distillates. In one aspect, it relates to the use of a hydrogenated butadiene-styrene copolymer as a dewaxing aid in the dewaxing of waxy liquid petroleum distillates. In another of its aspects, the invention relates to improvement of the efficiency of filtration of precipitated wax from a liquid petroleum distillate by precipitating the wax in the presence of a small amount of hydrogenated butadiene-styrene random or block copolymer. In accordance with a further aspect, the invention relates to a process for precipitating wax from waxy liquid petroleum distillates in the absence of an added solvent by the addition of a small effective amount of a hydrogenated butadiene-styrene random or block copolymer prior to chilling and filtration.

BACKGROUND OF THE INVENTION

In a conventional process for removing wax from oils, the wax-bearing oil is dissolved in a solvent or solvent mixture at an elevated temperature and then the wax-oil-solvent solution is chilled to a sufficiently low temperature to effect precipitation or solidification of the wax. Following chilling, the precipitated wax is separated from the diluted oil by centrifuging, settling, or filtering. To a great extent, the capacity of filtration equipment depends upon the rate and effectiveness of the filtration which can be achieved.

In the past, many expedients have been employed to improve the effectiveness of filtration in wax-oil separation. One of the most common techniques in this field involves the employment of substances which are added to an oil and solvent mixture and which are known in the art as "wax modifiers," "wax conditioners," "wax separation aids," or "filtration aids." Vast numbers of compounds of widely varying chemical types have been investigated or utilized to prevent blocking of the filter by the wax crystals, increase rate of filtration, etc.

In accordance with the invention, it has been found that the addition of small effective amounts of hydrogenated butadiene-styrene copolymers to petroleum distillates effectively improves the subsequent filtering operation without the addition of solvent to the system.

It is an object of this invention to provide an improved process for dewaxing petroleum distillates.

It is a further object of this invention to reduce the filtration time of petroleum distillates in a dewaxing process.

Other objects, aspects and the several advantages of the invention are apparent from a study of this disclosure and the appended claims.

STATEMENT OF THE INVENTION

According to the invention, a hydrogenated butadiene-styrene random or block copolymer is used as a dewaxing aid in a process for dewaxing waxy liquid petroleum distillates such as diesel fuels and the like.

We have found that a hydrogenated random or block configuration copolymer of butadiene and styrene is an effective aid in the dewaxing of waxy petroleum distillates. The copolymer serves to improve the filterability of such distillates by increasing the porosity of the wax cake, thus allowing the liquid phase to pass through the filter leaving essentially dry crystalline wax on the filter medium.

In accordance with a specific embodiment of the invention, liquid petroleum distillates are dewaxed effectively by mixing therewith a small effective amount of a hydrogenated butadiene-styrene copolymer to act as a dewaxing aid, chilling the mixture thus formed to a temperature sufficient to precipitate the wax contained in the distillate, and then subjecting the chilled mixture to filtration to separate therefrom a substantially oil-free wax at a high filtration rate.

The hydrogenated copolymers or additives of the present invention have a molecular weight in the approximate range of from about 2000 to about 200,000, a now preferred range being from about 5000 to about 100,000 and a now still more preferred range being from about 25,000 to about 50,000. The copolymers can be one containing from about 2 to about 98 parts by weight of styrene per hundred parts by weight of monomers. Thus, the broad range of the butadiene-styrene ratio in the copolymer can extend from about 98:2 to about 2:98, but now from about 60:40 to about 90:10 is preferred with particularly satisfying results being obtained with a copolymer having a 75:25 ratio.

The hydrogenated copolymer molecular weight referred to throughout this application refers to number-average molecular weight. The number-average molecular weight of a specific butadiene-styrene copolymer is determined by methods which are conventional in the art. For example, a particularly convenient method for determining the molecular weight of copolymers in the 15,000 to 200,000 range is by the membrane osmometer. Such a procedure is described in a paper by R. E. Steele et al. at the Pittsburgh Conference on Analytical Chemistry and Applied Spectroscopy in March 1963. For copolymers in the 5,000 to 15,000 range, ebullioscopic methods are appropriate, such as the technique described by R. L. Arnett et al. in the Journal of Polymer Science, Part A, vol. I, pp. 2753–2764 (1963). For copolymers having molecular weights below 5,000, methods employing the use of a vapor pressure osometer such as that available from Mechrolab Inc., 1062 Linda Vista Ave., Mountain View, Calif., are appropriate.

The hydrogenated copolymers of the present invention can be prepared by any of the conventional techniques known in the art. For example, the butadiene-styrene mixture of monomers can be polymerized using butyllithium as the catalyst. The hydrogenation can be carried out over a nickel octoatetriethylaluminum catalyst system. U.S. Pat. 2,864,809, R. V. Jones et al., issued Dec. 16, 1958, describes a technique for hydrogenating butadiene-containing polymers. The hydrogenated butadiene-styrene copolymers of the present invention are polymers which have been sufficiently hydrogenated to remove substantially all of the olefinic unsaturation leaving only the aromatic unsaturation.

The dewaxing aid or additive copolymer of the present invention is generally added to the petroleum distillate fuels in amounts which range from about 0.01 to about 5 weight percent of the distillate fuel.

The distillate fuels to which the present invention is applicable include such petroleum fractions or catalytically modified fractions or mixtures thereof which boil at temperatures in the range of from about 70 to about 750° F. These fuels include gasolines, such as aviation, marine, and automotive gasolines, jet fuels, diesel fuels, heating oils, and the like.

Among the distillates which are applicable for use in the present invention are the following:

| Distillate: | Boiling range (initial-final) °F. |
|---|---|
| Gasolines | 70–420 |
| Jet fuels | 120–500 |
| Diesel fuels | 350–625 |
| Heating and stove oils | 450–570 |
| High boiling distillate fuels | 400–750 |

Conventional techniques for dispersing the copolymer additives of the invention in the distillate fuels can be used.

In addition to the additives of the present invention, the treated petroleum distillate fuels can also contain commonly used ingredients such as antioxidants, colorants, combustion improvers, antiknock compounds, and the like.

In carrying out the invention, the copolymer additives of the invention can be added to the distillate fuels in any suitable manner. Following mixing of the copolymer additive with the petroleum distillate, the mixture is cooled by chilling to a temperature in the range of $+20°$ F. to $-60°$ F. to precipitate the wax from the liquid petroleum distillate. The chilled mixture of liquid petroleum distillate and hydrogenated butadiene-styrene copolymer can be subjected to conventional filtration. As indicated previously, the chilled mixture is transported to a filter where wax is removed and the dewaxed petroleum distillate is recovered. As indicated by the specific working example set forth hereinbelow, the wax separated according to the invention was unusually oil-free, but, if desired, the crude wax can be washed on the filter.

SPECIFIC EXAMPLE

A hydrogenated random configuration copolymer of butadiene and styrene was found to be an effective aid in the dewaxing of waxy petroleum distillates without added solvent. The copolymer serves to improve the filterability of petroleum distillates by increasing the porosity of the wax cake thus allowing the liquid phase to pass through the filter, leaving essentially dry crystalline wax on the filter medium.

The butadiene-styrene random copolymer was prepared using the following recipe and conditions:

| | |
|---|---|
| Cyclohexane/monomer | 90/10 by wt. |
| Butadiene/styrene | 75/25 wt. |
| Butyllithium initiator | 0.3 phm. (parts per hundred monomer). |
| Tetrahydrofuran | 4.0 phm. |
| Polymerization temp., range | 130° F. to 225° F. |
| Resulting molecular weight | 33,000 wt. avg./20,000 No. avg. |
| Vinyl unsaturation | 24% wt. |
| Trans unsaturation | 27% wt. |

The copolymer prepared as above was then hydrogenated as follows:

| | |
|---|---|
| Temperature | 350° F. |
| Pressure | 300 p.s.i.g. |
| Ni (As nickel octoate) | 0.25 phr. |
| Al (as triethyl aluminum)/Ni | 2:1 molar. |
| Unsaturation | 0.8 to 2.4% wt. based on total polymer. |

The 500 gram quantity of regular diesel fuel having a natural pour point of 0° F. was treated with 0.06 weight percent of the hydrogenated butadiene-styrene copolymer prepared above.

The treated fuel was placed in a suitable container and sealed at $-20°$ F. for a period of 16 hours whereupon it was then filtered through No. 1 Whatman filter paper. This treated fuel passed through the filter at the rate of 72.5 ml./min., whereas the same fuel without the addition of the polymer, chilled in exactly the same way, flowed through the filter at the rate of 1.5 ml./min., or in other words the treated fuel flowed nearly 50 times as fast as the untreated.

The wax separated by use of the hydrogenated random butadiene-styrene copolymer was unusually oil free; residual oil in the wax cake amounted to approximately 3 percent (wt.) of the charged fuel and this was easily removed by a single wash with $-20°$ F. acetone.

We claim:
1. A process for dewaxing waxy petroleum distillates in the absence of an added solvent which comprises:
   (a) mixing a waxy liquid petroleum distillate diesel fuel with a small effective amount of a hydrogenated random butadiene-styrene copolymer additive having a molecular weight in the range 2,000–200,000 to act as a dewaxing aid,
   (b) chilling the mixture thus formed in step (a) to a temperature sufficiently low to precipitate wax contained in said distillate, and
   (c) subjecting the chilled mixture obtained in step (b) to filtration to separate therefrom a substantially oil-free wax at a high filtration rate.

2. A process according to claim 1 wherein said copolymer additive is present in an amount in the approximate range 0.01–5 weight percent of the liquid hydrocarbon distillate diesel fuel and further wherein said mixture obtained in step (a) is chilled by cooling to a temperature in the range $+20°$ F. to $-60°$ F.

3. A process according to claim 1 wherein the copolymer has a molecular weight in the approximate range of 25,000 to 50,000 and is prepared by copolymerization using a butyllithium catalyst and the hydrogenation is effective to remove substantially all of olefinic unsaturation.

4. A process according to claim 1 wherein said copolymer is a random copolymer of butadiene and styrene with a butadiene to styrene weight ratio ranging from about 60:40 to about 90:10.

5. A process according to claim 1 wherein said copolymer is a solution polymerized random copolymer containing about 75 weight parts butadiene and about 25 weight parts styrene per 100 weight parts copolymer and further wherein said hydrogenated copolymer contains 0.8–2.4 weight percent olefinic unsaturation based on total copolymer.

References Cited
UNITED STATES PATENTS

| 3,451,920 | 6/1969 | DeVault et al. | 208—33 |
| 3,262,873 | 7/1966 | Tiedje et al. | 208—38 |

HERBERT LEVINE, Primary Examiner

U.S. Cl. X.R.

208—37